(12) United States Patent
Pica

(10) Patent No.: US 10,412,792 B2
(45) Date of Patent: Sep. 10, 2019

(54) MICROWAVABLE FOOD STAND

(71) Applicant: Jerry Pica, San Diego, CA (US)

(72) Inventor: Jerry Pica, San Diego, CA (US)

( * ) Notice: Subject to any disclaimer, the term of this patent is extended or adjusted under 35 U.S.C. 154(b) by 394 days.

(21) Appl. No.: 15/361,688

(22) Filed: Nov. 28, 2016

(65) Prior Publication Data

US 2018/0152993 A1    May 31, 2018

(51) Int. Cl.

| | |
|---|---|
| *H05B 6/80* | (2006.01) |
| *H05B 6/38* | (2006.01) |
| *B65D 81/34* | (2006.01) |
| *A47J 37/10* | (2006.01) |
| *H05B 6/64* | (2006.01) |
| *A47J 36/02* | (2006.01) |

(52) U.S. Cl.
CPC .......... *H05B 6/6408* (2013.01); *A47J 36/027* (2013.01)

(58) Field of Classification Search
CPC ....... H05B 6/6408; F16M 11/22; A47J 36/027
USPC ....... 219/725, 726, 727, 728, 729, 730, 731, 219/756, 672, 759, 734, 449.1; 426/520, 426/107, 549, 113, 234; 99/426, 233, 99/549, 425; 220/573; 428/580
See application file for complete search history.

(56) References Cited

U.S. PATENT DOCUMENTS

| | | | | |
|---|---|---|---|---|
| 1,954,080 | A * | 4/1934 | Kahn | A47J 37/10 126/339 |
| 3,664,256 | A * | 5/1972 | Peirce | A47J 37/0676 99/425 |
| 6,187,354 | B1 * | 2/2001 | Hopkins | B65D 43/162 219/734 |
| 8,803,050 | B2 * | 8/2014 | Lafferty | H05B 6/6408 219/730 |

\* cited by examiner

*Primary Examiner* — Quang T Van

(57) ABSTRACT

The microwavable heat stand is an apparatus that allows microwave energy to directly reach a food item along surfaces that normally rest on a plate, a bowl, or any other comparable dish. The apparatus includes a base plate, a plurality of dividers, and a plurality of waveguide channels. Each of the plurality of dividers includes a proximal end and a distal end. The plurality of dividers is distributed across the base plate. The proximal end of each of the plurality of dividers is connected adjacent to the base plate. Consequently, the distal end for each of the plurality of dividers provides a surface for which the food item may rest. Each of the waveguide channels is delineated by the base plate and a pair of adjacent dividers from the plurality of dividers, allowing microwave energy to flow from the outer edge of the base plate to the center of the base plate.

14 Claims, 8 Drawing Sheets

MICROWAVABLE FOOD STAND

FIELD OF THE INVENTION

The present invention relates generally to food stands. More specifically, the present invention is a microwavable food stand that facilitates the flow of the microwave energy beneath a food item.

BACKGROUND OF THE INVENTION

Microwave ovens are common appliances found in many homes, workplaces, restaurants, and so on. Heating food in microwave oven has become the easiest solution to eating food prepared outside of the home or food that is not freshly made. Though the food is edible, food heated in the microwave is not always the best quality. It is known that heating or reheating food in the microwave lessens the quality of the food. One of the main reasons for the decreasing quality of microwave heated foods is the uneven heating.

The present invention serves to uniformly heat food by allowing microwave energy to reach surfaces of the food that do not typically receive direct contact with the microwaves. The present invention not only elevates food from a spinning plate or sliding plate of the microwave oven, but allows the microwave energy to reach the bottom surface of the food that is either directly on the stand or rests on a plate, bowl, or any other microwavable dish or container. This prevents the food from becoming soggy underneath as moisture is trapped under the food item. This also prevents the food item from being unevenly heated. The present invention allows a user to heat food in the microwave without compromising the quality of his or her food. An alternate embodiment of the present invention comprises a basin that collects any drippings or crumbs that may fall from the food item, lessening the possibility of a mess.

DETAILED DESCRIPTION OF THE INVENTION

All illustrations of the drawings are for the purpose of describing selected versions of the present invention and are not intended to limit the scope of the present invention.

Figure 1:
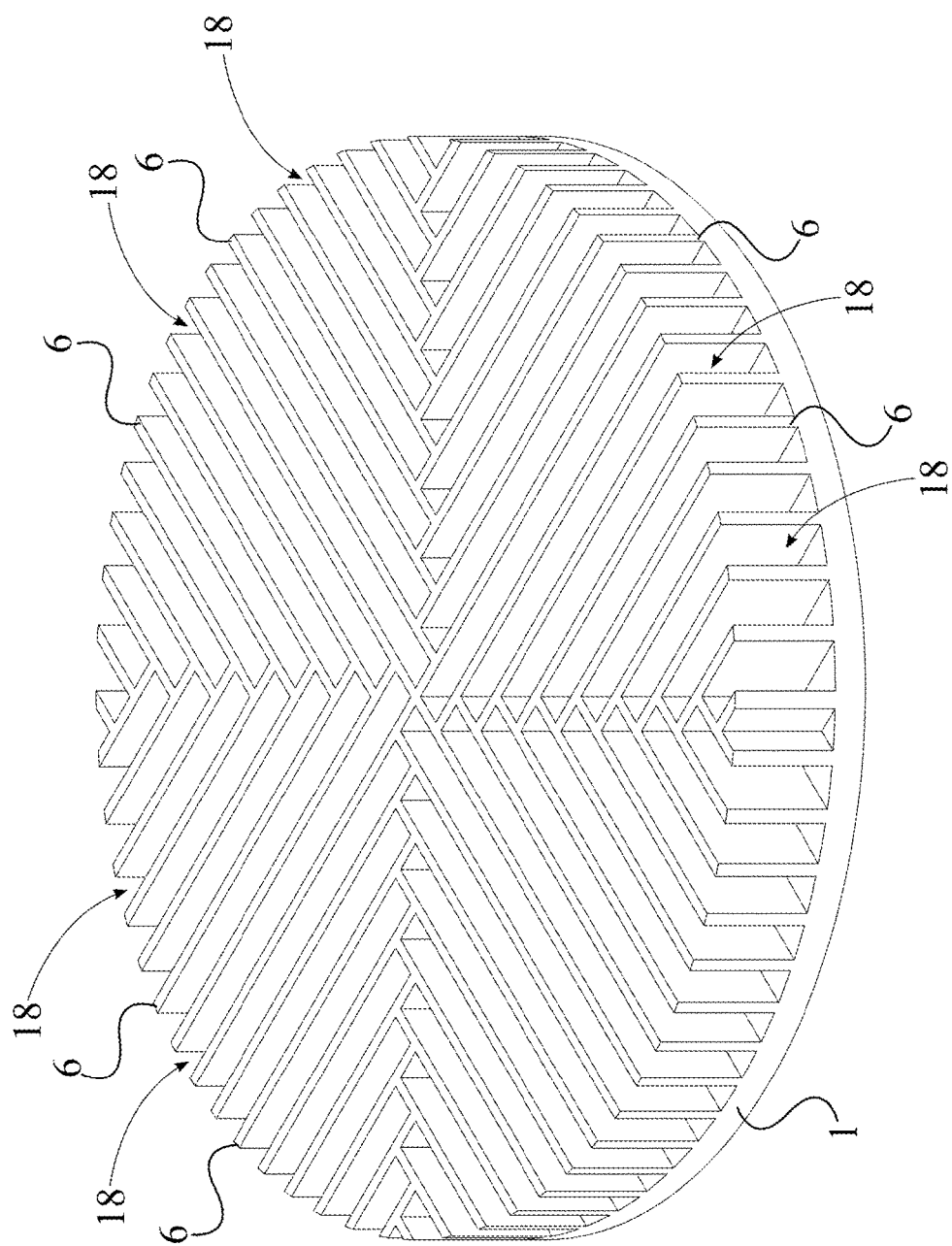
FIG. 1 is a perspective view of the preferred embodiment of the present invention.

The present invention is a microwavable food stand that prevents a food item from becoming soggy along the surfaces that rest on a plate, bowl, or any other comparable container which upholds food items. The present invention effectively heats a food item by allowing the microwaves to come into direct contact with most of the surfaces of the food item that normally press against a plate, bowl, or any other food container upholding the food item. If the present invention is not beneath the food item, the surfaces pressing against the plate, bowl, or comparable food container becomes soggy and the center of the food item does not receive heat evenly. The present invention comprises a base plate 1, a plurality of dividers 6, a plurality of waveguide channels 18, as shown in FIG. 1. The base plate 1 acts as a barrier between a spinning plate or a sliding plate of the microwave oven and the food item. Any crumbs or drippings of the food item fall onto the base plate 1 instead of the spinning plate or sliding plate of the microwave oven. The base plate 1 lessens or eliminates the cleaning of the microwave containing the present invention and the food item. The plurality of dividers 6 elevates the food item from the spinning plate or sliding plate of the microwave and defines the plurality of waveguide channels 18. Each of the plurality of dividers 6 comprises a proximal end 7 and a distal end 8. The plurality of waveguide channels 18 allows microwaves to reach surfaces of the food item that are not typically directly exposed.

Figure 3:
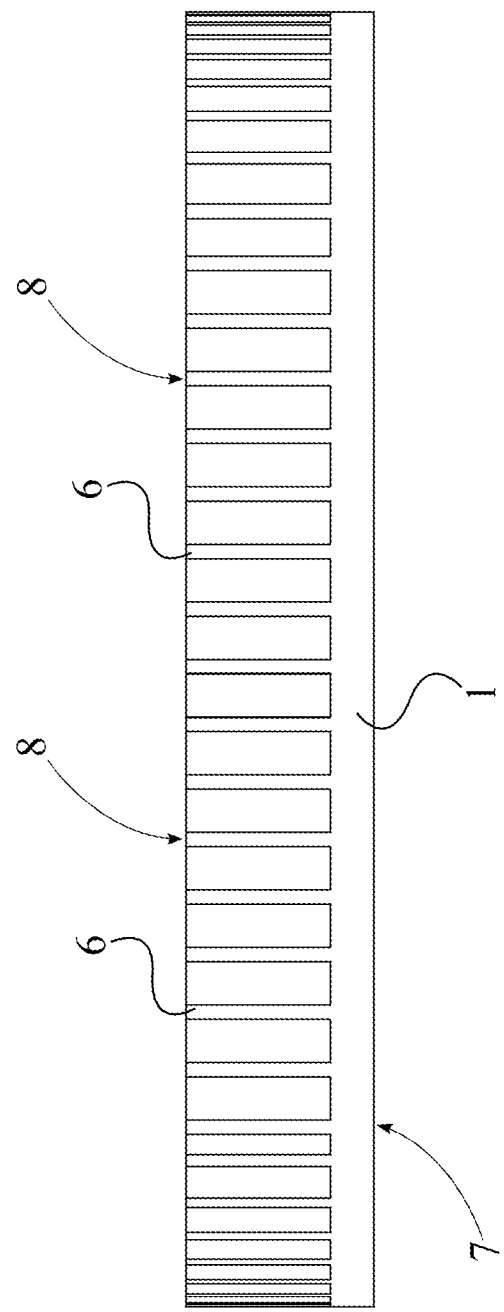
FIG. 3 is a front side view of the preferred embodiment of the present invention.
Figure 5:
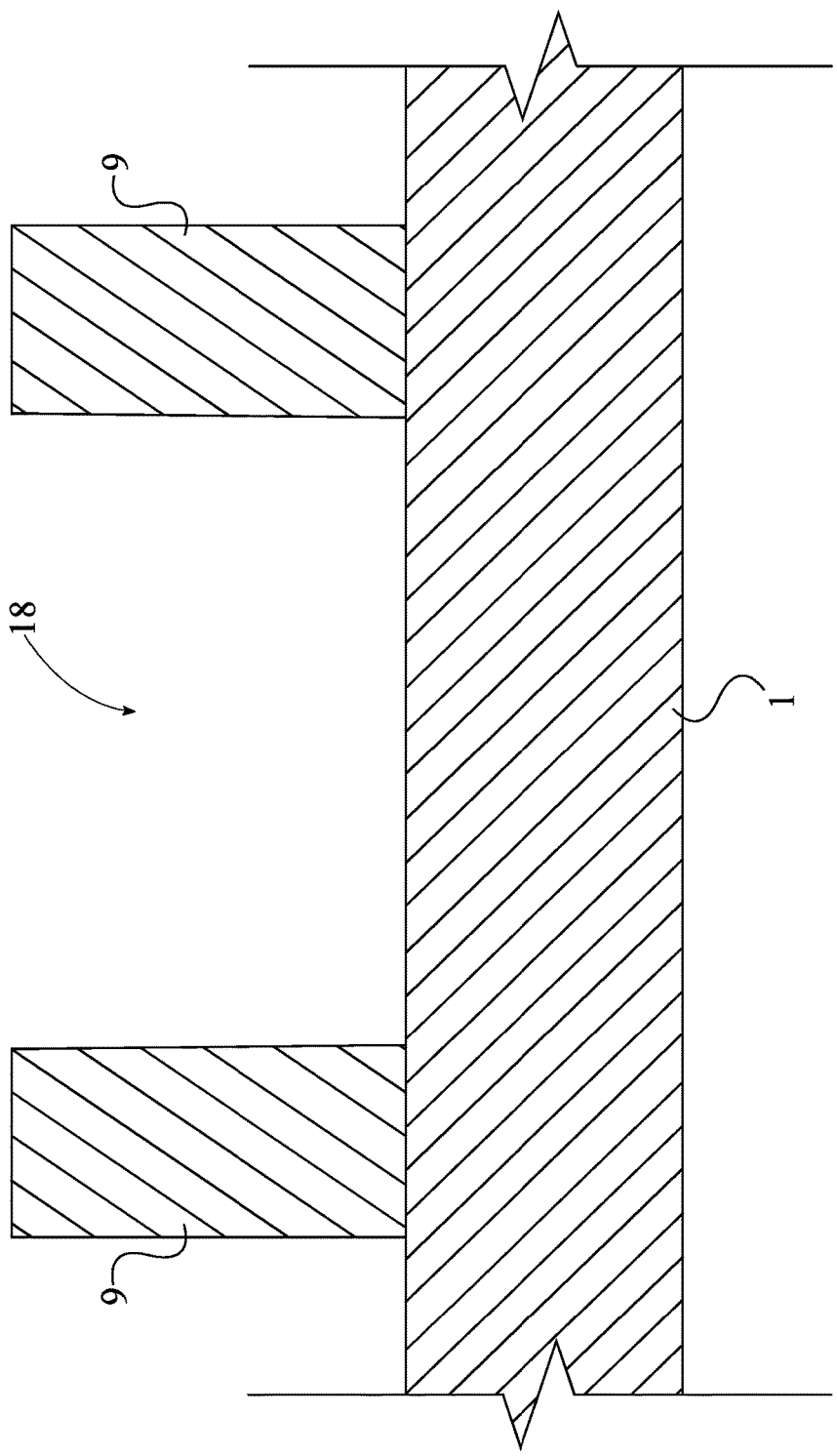
FIG. 5 is a detailed cross-schematic view of the preferred embodiment of the present invention.

The overall configuration of the aforementioned components allows the present invention uniformly heat the food item resting on the plurality of dividers 6. The plurality of dividers 6 is distributed across the base plate 1 so that the food item does not rest directly onto the base plate 1, as illustrated in FIG. 3. Each of the plurality of waveguide channels 18 are delineated by the base plate 1 and a pair of adjacent dividers 9 from the plurality of dividers 6, as illustrated in the schematic view of FIG. 5, such that microwaves continuously flows from the outer edge of the base plate 1 to the center 2 of the base plate 1.

Figure 2:
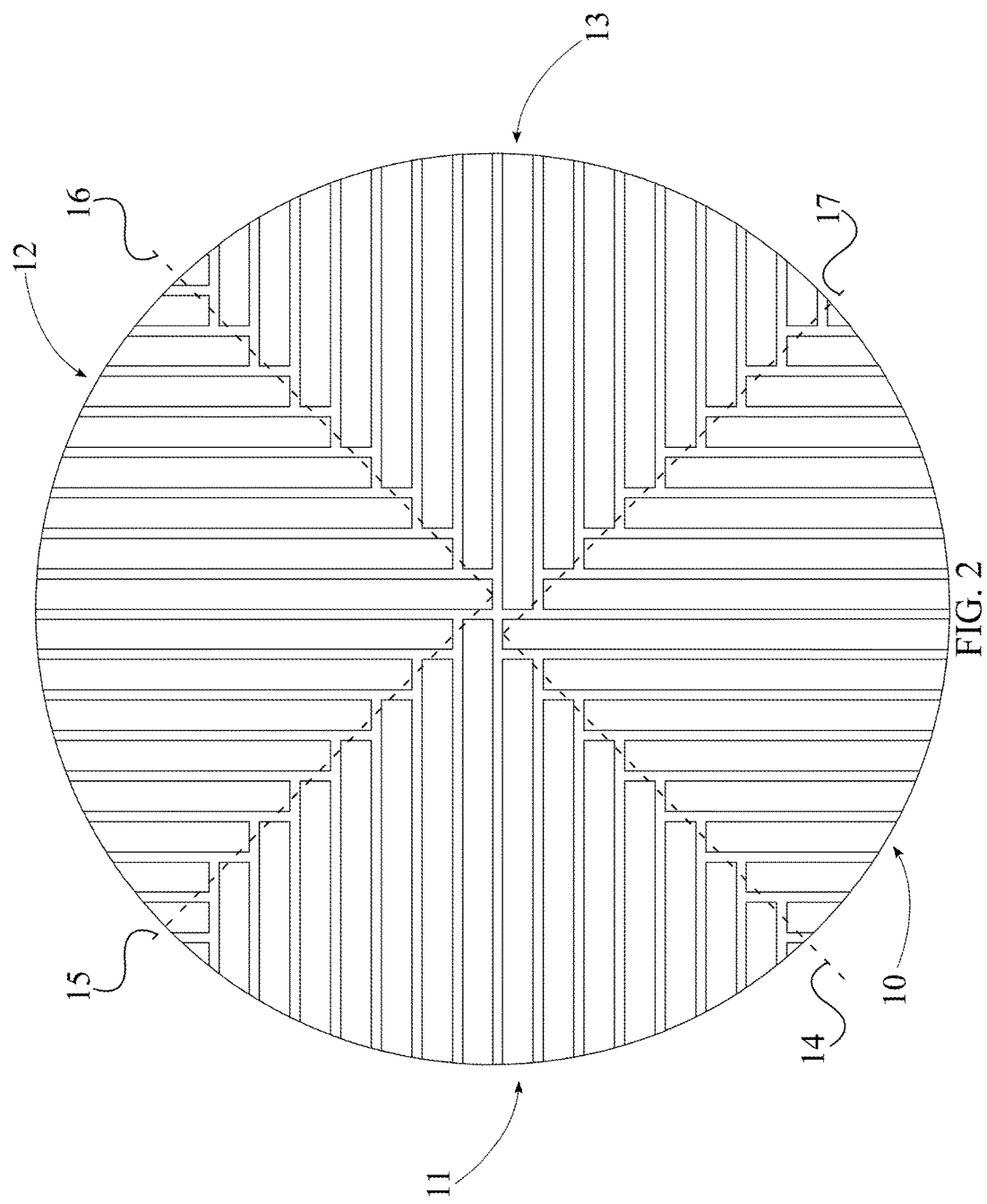
FIG. 2 is a top side view of the preferred embodiment of the present invention.
Figure 4:
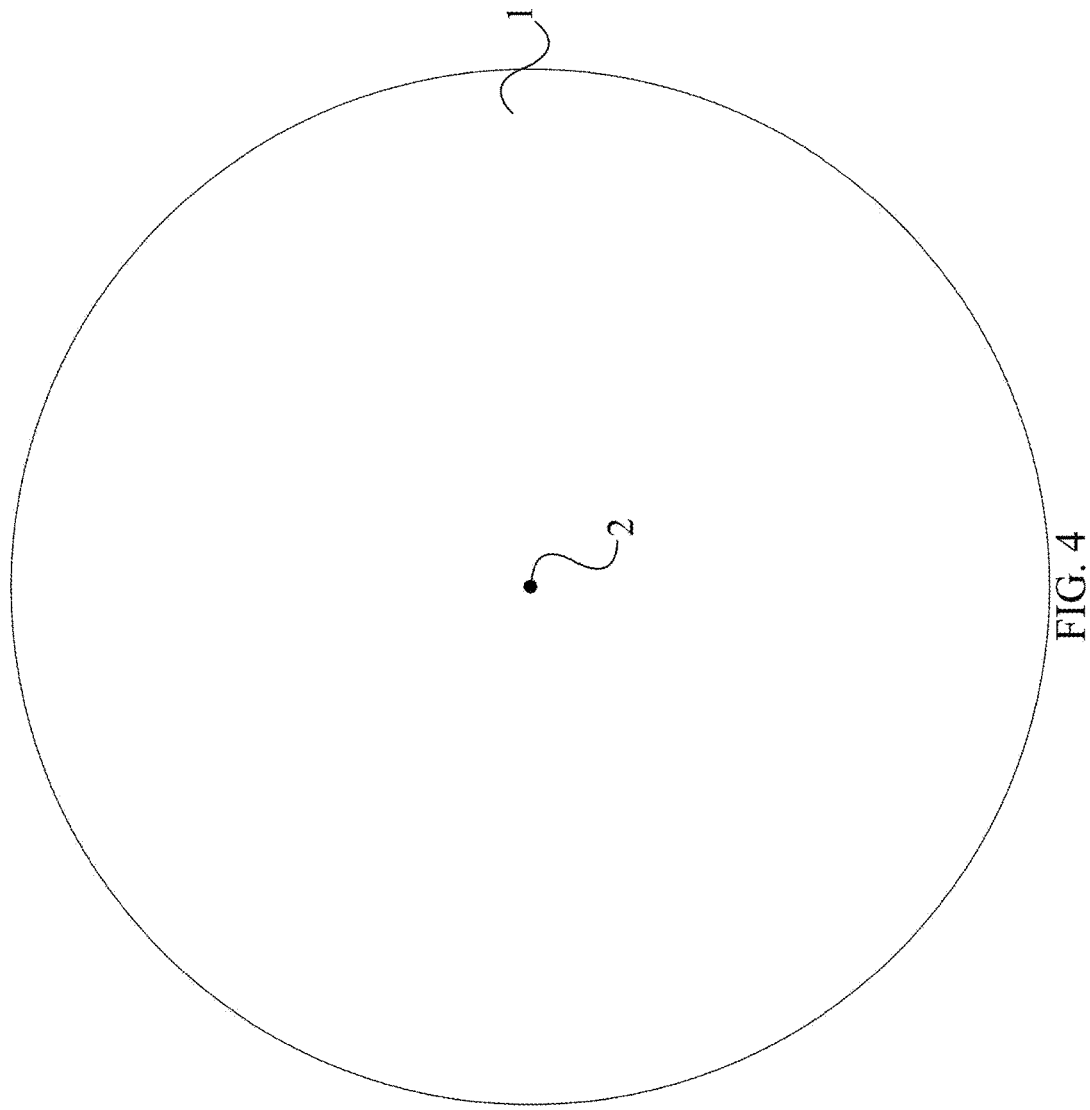
FIG. 4 is a bottom side view of the preferred embodiment of the present invention.

In the preferred embodiment of the present invention, the base plate 1 is a circular shape. The circular shape mirrors that of a typical dish plate, as illustrated in FIG. 4. It is understood that the base plate 1 may be a variety of shapes and sizes that accommodate a variety of food items. The plurality of dividers 6 is radially positioned about the center 2 of the base plate 1, as shown in FIG. 2. More specifically, the plurality of dividers 6 comprises a first set of dividers 10, a second set of dividers 11, a third set of dividers 12, and a fourth set of dividers 13. Each of the first set of dividers 10, the second set of dividers 11, the third set of dividers 12, and the fourth set of dividers 13 define a path of heat flow that traverses from the outer edge of the base plate 1 to the center 2 of the base plate 1. The first set of dividers 10, the second set of dividers 11, the third set of dividers 12, and the fourth set of dividers 13 are radially positioned about the center 2 of the base plate 1. This configuration further encourages microwaves to flow through each of the plurality of dividers 6, evenly heating the food item. Furthermore, each divider within the first set of dividers 10 are parallel to each other so that the first set of dividers is able to provide a series of pathways for microwaves to flow from the outer edge of the base plate to the center of the base plate. Each divider within the second set of dividers 11 are parallel to each other. Each divider within the third set of dividers 12 are parallel to each other. Each divider within the fourth set of dividers 13 are parallel to each other. Consequently, the first set of dividers 10 and the third set of dividers 12 are diametrically opposed to each other about the base plate 1 and positioned parallel to each other. Similarly, the second set of dividers 11 and the fourth set of dividers 13 are diametrically opposed to each other about the base plate 1 and positioned parallel to each other. This parallel configuration allows for microwaves to flow through each of the waveguide channels 18 with lessened hindrance.

Furthermore, in the preferred embodiment, the first set of dividers 10 and the second set of dividers 11 are positioned radial adjacent to each other, resulting in a radial border 14 that is formed between the intersection of the first set of dividers 10 and the second set of dividers 11. This arrangement is shown in FIG. 2. The radial border 14 between the intersection of the first set of dividers 10 and the second set of dividers 11 is radially positioned about the center of the base plate 1. The second set of dividers 11 and the third set of dividers 12 are positioned radial adjacent to each other, resulting in a radial border 15 that is formed between the intersection of the second set of dividers 11 and the third set of dividers 12. The third set of dividers 12 and the fourth set of dividers 13 are positioned radial adjacent to each other, resulting in a radial border 16 that is formed between the third set of dividers 12 and the fourth set of dividers 13. The fourth set of dividers 13 and the first set of dividers 10 are positioned radial adjacent to each other, resulting in a radial border 17 that is positioned in between the fourth set of dividers 13 and the first set of dividers 10. The radial borders amongst the plurality of dividers 6 separate the first set of dividers 10, the second set of dividers 11, the third set of dividers 12, and the fourth set of dividers 13 from each other. Consequently, each radial border is radially positioned about the center 2 of the base plate 1. This configuration maximizes the exposed surface area of the food item adjacent the plurality of dividers 6.

Figure 6:
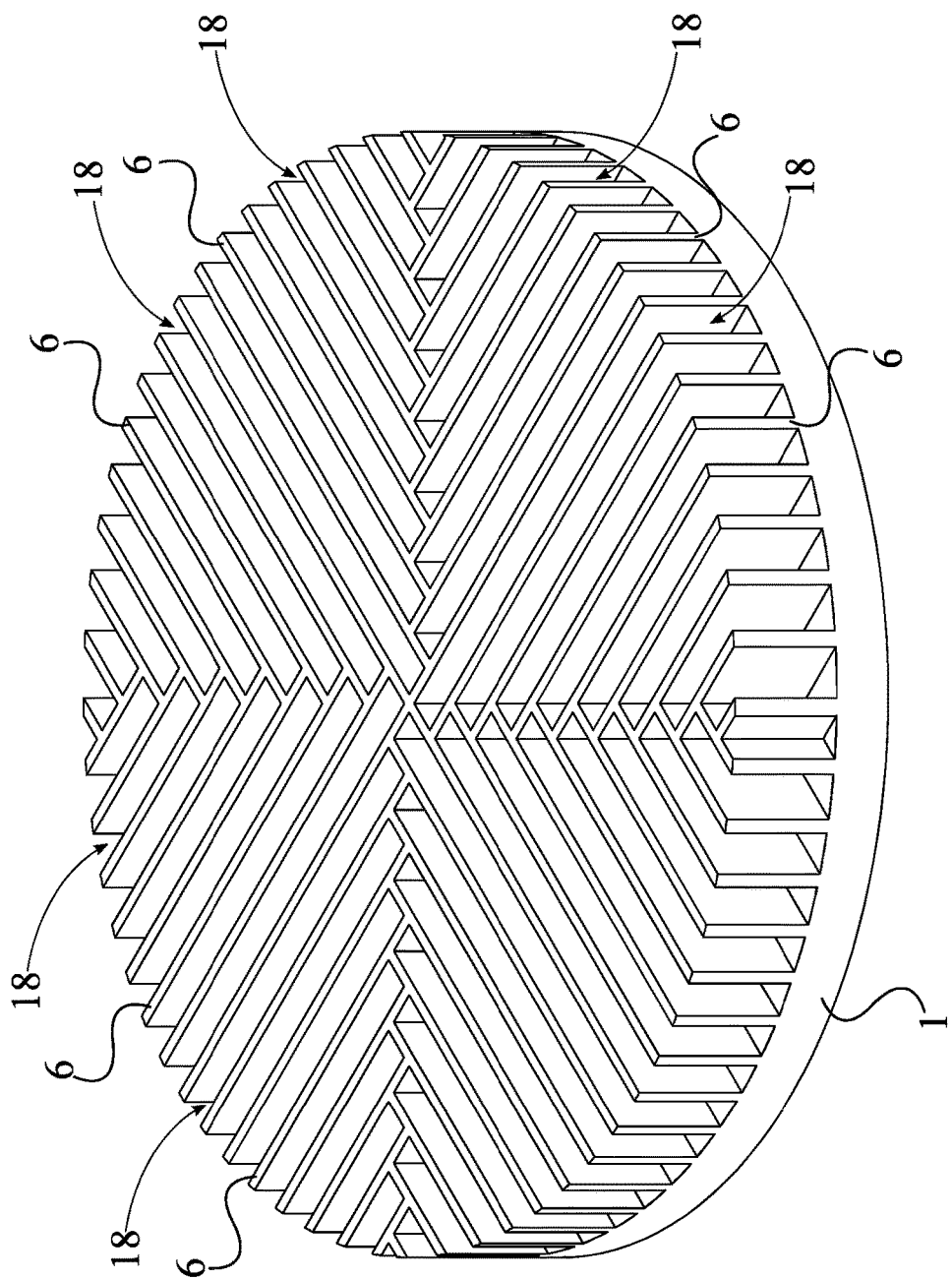
FIG. 6 is a perspective view of the alternate embodiment of the present invention.
Figure 7:
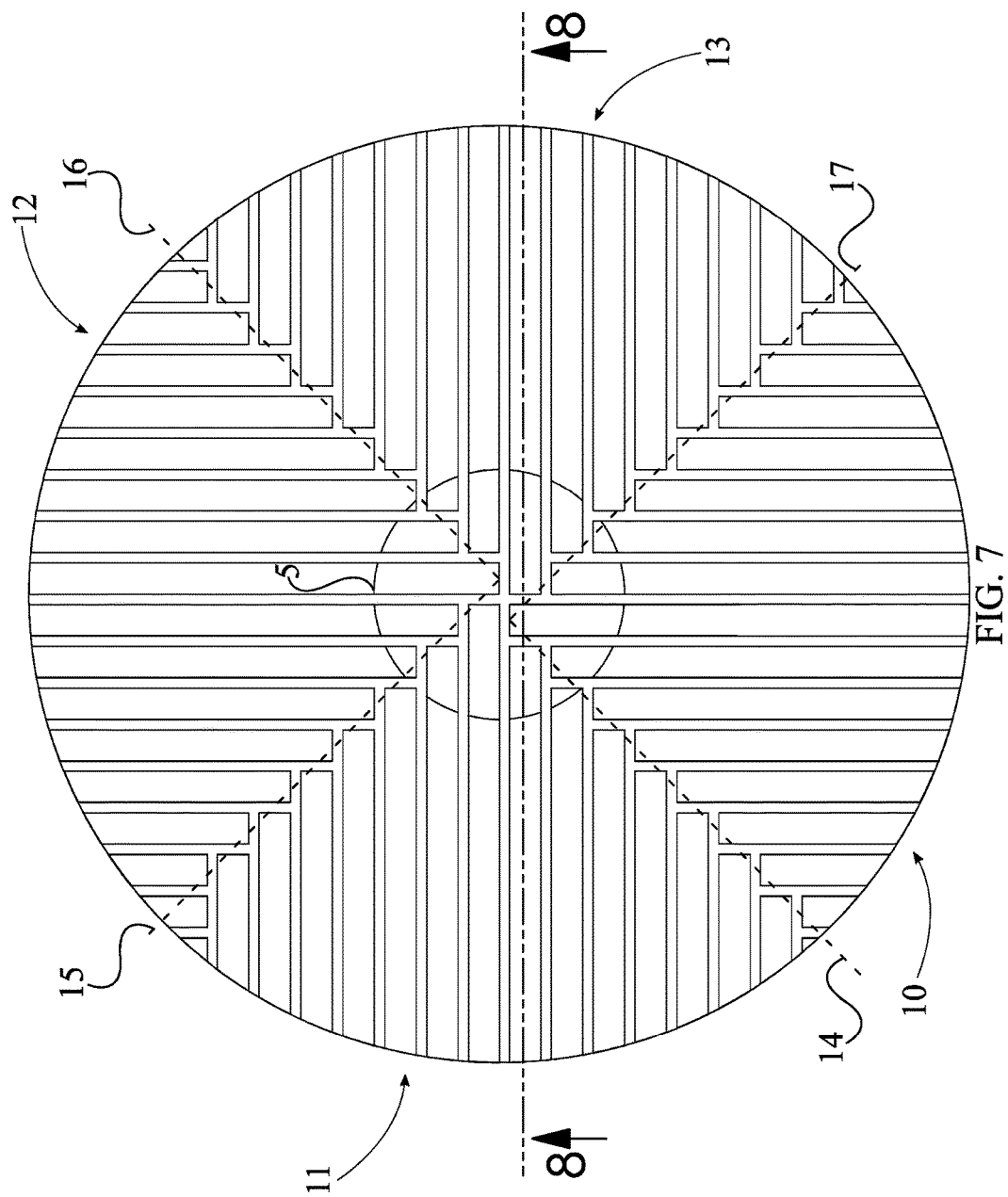
FIG. 7 is a top side view of the alternate embodiment of the present invention.
Figure 8:
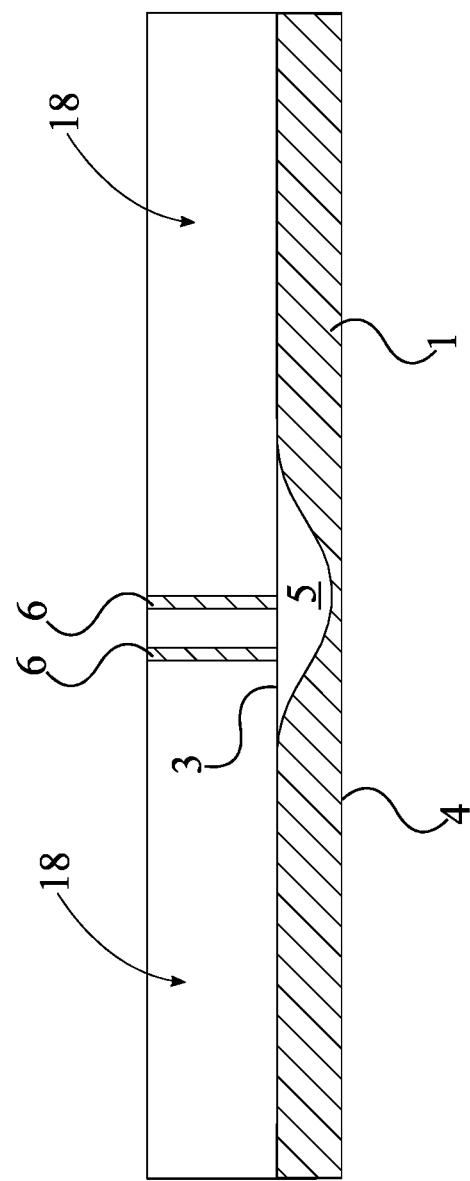
FIG. 8 is a cross-section view of the alternate embodiment of the present invention.

In some embodiments of the present invention, the base plate 1 comprises a first surface 3, a second surface 4, and a basin 5, as illustrated in FIG. 6. The first surface 3 upholds the plurality of dividers 6. The second surface 4 is presses against a spinning plate or sliding plate of a microwave oven. More specifically, the second surface 4 is flat. The basin 5 collects any drippings from the food item upheld by the present invention. The basin 5 traverses into the base plate 1 from the first surface 3, thereby readily collecting any drippings from the food above the plurality of dividers 6, as shown in FIG. 8. Consequently, the plurality of dividers 6 is positioned adjacent to the first surface 3. Furthermore, the basin 5 is coincidentally positioned with the base plate 1 as to better ensure that none of the drippings from the food item escape the base plate 1, as illustrated in FIG. 7.

Although the invention has been explained in relation to its preferred embodiment, it is to be understood that many other possible modifications and variations can be made without departing from the spirit and scope of the invention as hereinafter claimed.

What is claimed is:

1. A microwavable food stand comprises:
a base plate;
a plurality of dividers;
a plurality of waveguide channels;
each of the plurality of dividers comprises a proximal end and a distal end;
the plurality of dividers being distributed across the base plate;
the proximal end of each of the plurality of dividers being connected adjacent to the base plate;
each of the waveguide channels being delineated by the base plate and a pair of adjacent dividers from the plurality of dividers;
the plurality of dividers comprises a first set of dividers, a second set of dividers, a third set of dividers, and a fourth set of dividers;
the first set of dividers, the second set of dividers, the third set of dividers, and the fourth set of dividers being radially positioned about a center of the base plate;
each divider within the first set of dividers being parallel to each other;
each divider within the second set of dividers being parallel to each other;
each divider within the third set of dividers being parallel to each other; and
each divider within the fourth set of dividers being parallel to each other.

2. The microwavable food stand as claimed in claim 1 comprises:
the base plate being a circular shape.

3. The microwavable food stand as claimed in claim 1 comprises:
the plurality of dividers being radially positioned about a center of the base plate.

4. The microwavable food stand as claimed in claim 1 comprises:
the first set of dividers and the third set of dividers being diametrically opposed to each other about the base plate; and
the first set of dividers and the third set of dividers being positioned parallel to each other.

5. The microwavable food stand as claimed in claim 1 comprises:
the second set of dividers and the fourth set of dividers being diametrically opposed to each other about the base plate; and
the second set of dividers and the fourth set of dividers being positioned parallel to each other.

6. The microwavable food stand as claimed in claim 1 comprises:
the first set of dividers and the second set of dividers being positioned radial adjacent to each other;
a radial border being formed between an intersection of the first set of dividers and the second set of dividers; and
the radial border being radially positioned about the center of the base plate.

7. The microwavable food stand as claimed in claim 1 comprises:
the second set of dividers and the third set of dividers being positioned radial adjacent to each other;
a radial border being formed between an intersection of the second set of dividers and the third set of dividers; and
the radial border being radially positioned about the center of the base plate.

8. The microwavable food stand as claimed in claim 1 comprises:
the third set of dividers and the fourth set of dividers being positioned radial adjacent to each other;
a radial border being formed between an intersection of the third set of dividers and the fourth set of dividers; and
the radial border being radially positioned about the center of the base plate.

9. The microwavable food stand as claimed in claim 1 comprises:
the fourth set of dividers and the first set of dividers being positioned radial adjacent to each other;
a radial border being formed between an intersection of the fourth set of dividers and the first set of dividers; and the radial border being radially positioned about the center of the base plate.

10. The microwavable food stand as claimed in claim 1 comprises:
    the base plate comprises a first surface, a second surface, and a basin;
    the basin traversing into the base plate from the first surface;
    the plurality of dividers being positioned adjacent to the first surface; and
    the second surface being flat.

11. The microwavable food stand as claimed in claim 10 comprises:
    the basin being coincidently positioned with the base plate.

12. A microwavable food stand comprises:
    a base plate;
    a plurality of dividers;
    a plurality of waveguide channels;
    each of the plurality of dividers comprises a proximal end and a distal end;
    the plurality of dividers being distributed across the base plate;
    the proximal end of each of the plurality of dividers being connected adjacent to the base plate;
    each of the waveguide channels being delineated by the base plate and a pair of adjacent dividers from the plurality of dividers;
    the base plate being a circular shape;
    the plurality of dividers being radially positioned about a center of the base plate;
    the plurality of dividers comprises a first set of dividers, a second set of dividers, a third set of dividers, and a fourth set of dividers;
    the first set of dividers, the second set of dividers, the third set of dividers, and the fourth set of dividers being radially positioned about a center of the base plate;
    each divider within the first set of dividers being parallel to each other;
    each divider within the second set of dividers being parallel to each other;
    each divider within the third set of dividers being parallel to each other;
    each divider within the fourth set of dividers being parallel to each other;
    the first set of dividers and the third set of dividers being diametrically opposed to each other about the base plate;
    the first set of dividers and the third set of dividers being positioned parallel to each other;
    the second set of dividers and the fourth set of dividers being diametrically opposed to each other about the base plate;
    the second set of dividers and the fourth set of dividers being positioned parallel to each other;
    the third set of dividers and the fourth set of dividers being positioned radial adjacent to each other;
    a radial border being formed between an intersection of the third set of dividers and the fourth set of dividers;
    the radial border being radially positioned about the center of the base plate;
    the fourth set of dividers and the first set of dividers being positioned radial adjacent to each other;
    a radial border being formed between an intersection of the fourth set of dividers and the first set of dividers; and
    the radial border being radially positioned about the center of the base plate.

13. The microwavable food stand as claimed in claim 12 comprises:
    the base plate comprises a first surface, a second surface, and a basin;
    the basin traversing into the base plate from the first surface;
    the plurality of dividers being positioned adjacent to the first surface; and
    the second surface being flat.

14. The microwavable food stand as claimed in claim 13 comprises:
    the basin being coincidently positioned with the base plate.

* * * * *